United States Patent [19]
Brooks

[11] Patent Number: 5,410,316
[45] Date of Patent: Apr. 25, 1995

[54] QUICK-REACTION ANTIJAMMING SEARCH RADAR

[75] Inventor: Herbert B. Brooks, Claremont, Calif.

[73] Assignee: Hughes Missile Systems Company, Los Angeles, Calif.

[21] Appl. No.: 589,921

[22] Filed: Mar. 5, 1984

[51] Int. Cl.$^6$ ............................................. H01Q 3/02
[52] U.S. Cl. .................................. 342/59; 342/175; 343/758
[58] Field of Search ..................... 343/5 R, 6 R, 758; 342/175, 59

[56] References Cited

U.S. PATENT DOCUMENTS

| | | | |
|---|---|---|---|
| 2,663,869 | 12/1953 | Adcock et al. | 343/758 |
| 2,939,140 | 5/1960 | Troost | 343/758 |
| 2,975,413 | 3/1961 | Landee et al. | 343/758 |
| 3,007,151 | 10/1961 | Cole et al. | 343/758 |
| 3,026,517 | 3/1962 | Nameth et al. | 343/758 |
| 3,047,856 | 7/1962 | Mosher et al. | 343/758 |
| 3,113,310 | 12/1963 | Standing | 343/758 |

FOREIGN PATENT DOCUMENTS 54-143047 11/1979 Japan .
455765 11/1936 United Kingdom .

Primary Examiner—Daniel T. Pihulic
Attorney, Agent, or Firm—Charles D. Brown; Randall M. Heald; Wanda K. Denson-Low

[57] ABSTRACT

A radar system with a main antenna that is rotatably supported to permit use in searching about a search axis includes an auxiliary antenna that is rotatably supported to permit use in complementing main antenna coverage. Rotational components and control circuitry are provided, both for simultaneously rotating the antennae with the auxiliary antenna poised in position relative to the main antenna to stop and face a direction just searched, and for separately stopping the auxiliary antenna in position to face a selected direction as rotation of the main antenna continues. One embodiment includes a coaxially-masted antenna support having a pair of coaxial masts mounted on a common support structure, one mast being rotatably mounted to support the main antenna and the other mast being fixed. A carriage is rotatably mounted on the coaxial masts to support the auxiliary antenna. One clutch mechanism selectively interconnects the carriage and the rotatable mast to cause them to rotate together and another clutch mechanism selectively interconnects the carriage and the fixed mast to cause carriage rotation to stop.

30 Claims, 4 Drawing Sheets

QUICK-REACTION ANTIJAMMING SEARCH RADAR

BACKGROUND OF THE INVENTION

This invention relates in general to radar systems, and pertains particularly to a search radar effecting coordinated use of complementary antennae.

In some radar systems effective hemispherical searching coupled with rapid target acquisition that is highly immune to interference is desirable. For example, a search radar system used for tracking or fire-control must often detect and track small, threatening targets, including sea-skimming targets and fast moving targets. It must often react quickly to the detection of an in-range target in order to commence firing against it, while combatting interference such as multiple targets, jamming, heavy rain clutter, surface clutter, and chaff.

These requirements make it desirable to employ a narrow-beam antenna to combat the interference and provide accurate target positional data, in combination with a broad-beam antenna for rapid hemispherical searching. In addition, they encourage using dynamic response characteristics and associated mechanical parameters that have resisted implementation in the prior art.

Some multichannel and multiarray systems exist in the prior art that are slow and incapable of the separate antenna positioning ability required to implement full-function search radar systems of the quick reaction, antijamming type desired for tracking or fire-control. In U.S. Pat. No. 2,975,413, for example, a "Ground-Controlled Approach System" is described which employs separate elevation and azimuth antennae which are rotatable about a common search axis. The antennae must be stopped together, however, and the system does not lend itself to rapid target acquisition.

U.S. Pat. No. 3,007,151 describes separate elevation and azimuth antennae which are mounted on an antenna housing to rotate in mutually perpendicular planes for use alternately as a precision approach radar antenna or an air surveillance antenna.

U.S. Pat. No. 3,047,856 describes separate elevation and azimuth antennae driven by the same motor in a precision approach radar. The azimuth antenna rotates continuously and clutches are used to decrease its angular velocity as it scans past a landing approach path.

U.S. Pat. No. 3,113,310 describes a system employing two antenna arrays that can rotate together in azimuth while one of the arrays nods in elevation so that echo energy received by the arrays is cancelled when they are on target.

British Patent No. 455,765 describes two antenna arrays arranged to rotate about a common axis, with clutches for disconnecting the drive. However, rotation of one antenna about the common axis cannot be stopped while the other continues to rotate.

Japanese Patent No. 54-143047 describes a single radar channel using two antennae that are mounted on separate carriages to alternatively rotate about a common axis, wherein the carriages are interconnected so that stopping one of them causes the other to rotate.

These prior art systems do not meet the stringent requirements of a full-function tracking or fire-control radar system, and it is desirable to have a system employing both a broad-beam main antenna and a narrow-beam auxiliary antenna that can be coordinated to achieve the increased system functionality and efficiency required.

SUMMARY OF THE INVENTION

This invention coordinates complementary radar antennae to achieve effective hemispherical searching coupled with rapid target acquisition that is highly immune to interference.

The invention includes a main antenna and an auxiliary antenna. The main antenna is rotatably supported so that it can be used to search about a search axis. The auxiliary antenna is rotatably supported so that it can be used to complement main antenna coverage.

Rotational components and an associated control system are provided to coordinate the antennae. These components function to simultaneously rotate the antennae. They also function to keep the auxiliary antenna advantageously oriented with respect to the main antenna so that the auxiliary antenna is in a ready position to stop and face a direction about the search axis that has just been searched by the main antenna. And, they function to stop rotation of the auxiliary antenna with the auxiliary antenna facing a selected direction while rotation of the main antenna about the search axis continues.

An exemplary embodiment includes a coaxially-masted antenna support having a pair of coaxial masts mounted on a common support structure to permit the rotational coordination desired. One mast is rotatably mounted for supporting the main antenna, the other mast is fixed, and a carriage is rotatably supported to span the two masts for supporting the auxiliary antenna. Clutch mechanisms are included for selectively interconnecting either the carriage and the rotatable mast or the carriage and the fixed mast to cause the carriage and auxiliary antenna to rotate or stop accordingly.

The above and other attendant objects and advantages of the invention will become apparent when the detailed description thereof is read in conjunction with the accompanying drawings wherein:

DETAILED DESCRIPTION OF THE INVENTION

Figure 1:
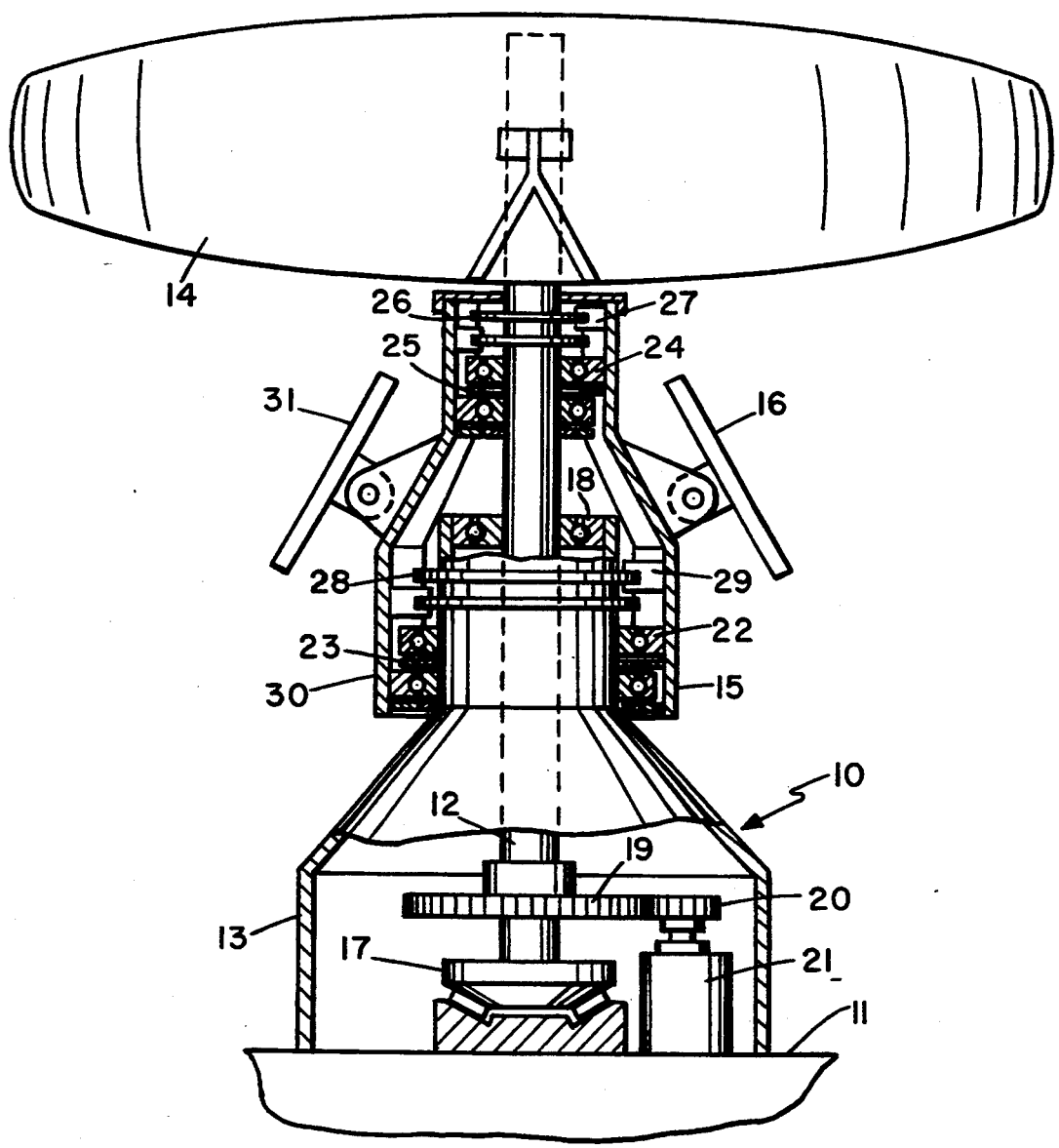
FIG. 1 is a side elevation view of an exemplary embodiment of the invention, with portions cut away to show the rotational components.

An exemplary embodiment of the invention is illustrated in FIG. 1. It is referred to generally by reference numeral 10 and shown to include a pair of coaxial masts mounted on common support structure 11. Mast 12 is shown rotatably mounted and mast 13 is shown to be fixed. Carriage 15 is rotatably mounted to span the two masts so that the assembly can rotatably support two antennae, main antenna 14 and auxiliary antenna 16, and permit their coordinated use.

The masts are mounted on the common support structure to extend vertically in axial alignment with a common search axis and coaxial alignment with each other. The common support structure illustrated represents any structure upon which the antenna support might be mounted, and the masts are rigidly mounted on the support structure so that they can support antennae and withstand the related weight and torsional forces.

Mast 12 is illustrated in FIG. 1 rotatably mounted on the support structure. It is a shaft that extends coaxially through the fixed mast to support main antenna 14, which may be a typical azimuth search antenna on the order of eight feet wide and five feet high with a broadbeam radiation pattern suitable for hemispherical searching.

Fixed mast 13 is a hollow structure through which the rotatable mast extends, and it is mounted on the support structure so that it will not rotate.

Carriage 15 is rotatably mounted on both masts to support auxiliary antenna 16, which may be a typical narrow-beam search antenna on the order of three feet wide by five feet high with a narrow-beam radiation pattern suitable for combating interference and determining target positional data. The radiation pattern may be narrow in elevation as well as azimuth, and the antenna may employ phased-array or mechanical scanning for height-finding and other functions, and generally have attributes and capabilities that complement those of the main antenna.

This arrangement of the carriage and coaxial masts permits the carriage and auxiliary antenna to be selectively interconnected and rotated with the rotatable mast and main antenna. It also permits the carriage and auxiliary antenna to be selectively interconnected with the fixed mast to cause carriage rotation to stop. A narrow-beam search or height-finding antenna can be thereby rotated with an azimuth search antenna in a position to quickly stop and face a direction of interest without interrupting the azimuth search for other targets. The narrow-beam antenna can be used in this manner to complement main antenna coverage by tracking targets, for example, or augmenting coverage in the direction of a threatening target or jammer.

Further details of the rotational components are illustrated in the cut away portions of FIG. 1. The rotatable mast is mounted on the support structure using main bearing 17. The main bearing is chosen to support the weight of the mast and the main antenna while permitting the mast to be rotated about the common search axis. The mounting of the rotatable mast includes bearing 18 between it and the fixed mast. This bearing retains the rotatable mast in axial alignment with a common search axis extending through the rotational center of the mast, as well as retaining it in coaxial alignment with the fixed mast.

Bull gear 19 is shown in FIG. 1 rigidly attached to the rotatable mast. The bull gear engages pinion gear 20 which is connected to azimuth drive motor 21. The azimuth drive motor is connected to the support structure, and it cooperates with the pinion gear and the bull gear to transmit rotational energy to the rotatable mast and rotate it about the common search axis.

These components serve to support and rotate the antennae according to the invention. They are capable of withstanding the weight and torsional forces involved, and of achieving the dynamic response characteristics desired, all according to well known design principles in the art.

Carriage 15 is rotatably mounted on the masts as shown in the cut away portions of FIG. 1. Bearing 22 and slip-ring assembly 23 rotatably mount the carriage on the fixed mast, and bearing 24 and slip-ring assembly 25 rotatably mount the carriage on the rotatable mast. These components are also chosen to withstand the weight and torsional forces involved, and they permit the carriage and rotatable mast to be interconnected to cause them to rotate together, or the carriage and the fixed mast can be interconnected to cause carriage rotation to stop.

The embodiment illustrated in FIG. 1 includes means for selectively interconnecting the carriage and the rotatable mast to cause them to rotate together. A flying clutch mechanism comprising a disc-and-calipers combination connected between the carriage and the rotatable mast performs this function. The disc-and-calipers combination employs axially aligned disc 26 rigidly attached to the rotatable mast to rotate therewith, and selectively-activated calipers 27 attached to the carriage in a position to selectively engage the disc and interconnect the carriage and the rotatable mast. Other clutch-type or brake-type mechanisms well known in the art such as a shoe-and-drum combination or a magnetic particle clutch may be employed for this purpose. A series of grooves engageable by a selectively-activated detent may also be employed in appropriate applications. The clutch mechanism employed should be capable of being selectively-activated and it should be sufficiently strong and lightweight to withstand the energy involved and to achieve the dynamic response characteristics desired. It may employ well-known means of electrical activation by a separately supplied control signal.

The embodiment illustrated in FIG. 1 also includes means for selectively interconnecting the carriage and the fixed mast to cause carriage rotation to stop. A stop clutch mechanism comprising a disc-and-calipers combination connected between the carriage and the fixed mast performs this function. This disc-and-calipers combination includes disc 28 and calipers 29, and the same general considerations apply in choosing these components as apply for disc 26 and calipers 27.

In the illustrated embodiment of FIG. 1, second carriage 30 is shown rotatably mounted on the mast in the same manner as carriage 15. The second carriage supports second auxiliary antenna 31. These components provide increased system functionality over a one-carriage configuration. They may be omitted without departing from the inventive concepts of the invention, however. With the two illustrated carriages, two auxiliary antennae can be employed with the accompanying drawback that one carriage cannot be fully rotated if the other one is stopped.

Figure 2:
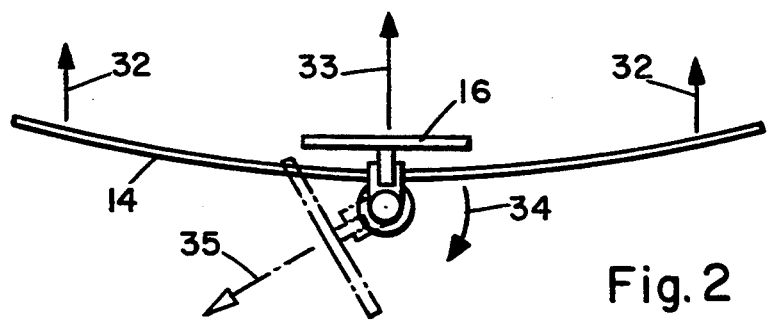
FIG. 2 illustrates relative rotation of the main antenna and the auxiliary antenna about the search axis.

Relative rotation of the main and auxiliary antennae is illustrated in FIG. 2, wherein arrows 32 represent the direction of the beam of main antenna 14 in a plane perpendicular to the search axis and arrow 33 represents the direction of the beam of auxiliary antenna 16 in the same plane. The antennae are arbitrarily illustrated rotating in a clockwise direction as depicted by arrow 34. With the engagement of the flying clutch between the carriage and the rotatable mast, the two antennae can be rotated together in the illustrated orientation. As the antennae approach the direction indicated by arrow 35, disengagement of the flying clutch between the carriage and the rotatable mast along with the simultaneous engagement of the stop clutch between the carriage and the fixed mast will cause carriage rotation to stop with the carriage facing the direction of arrow 35.

Auxiliary antenna 16 can be thereby stopped in the direction of arrow 35 to stare at a target of interest in that direction while main antenna 14 continues to rotate and search for other targets.

As a further refinement of this technique, the flying clutch can be engaged at the appropriate time to poise auxiliary antenna 16 in a position relative to main antenna 14 so that the auxiliary antenna rotates slightly behind the main antenna in accordance with the time required to complete passage of the main antenna across a target of interest, assess the target, and stop the auxiliary antenna with the auxiliary antenna facing the target. Accordingly, the clutch mechanisms between the carriage and the rotatable mast can be engaged at an appropriate time to cause the antennae to rotate together with the relative orientation of their beams such that the main antenna scans a given direction about the search axis slightly before the auxiliary antenna. The degree by which the auxiliary antenna lags behind the main antenna can be derived as a function of the rotational speed and dynamic response characteristics of the components employed in combination with various other related parameters, according to well-known design principles in the art.

As illustrated in FIG. 2, the antennae are supported so that they are both rotatable about the search axis. However, the auxiliary antenna can be supported to rotate about another, substantially parallel axis instead, and still be coordinated with the main antenna according to the inventive concepts herein disclosed. It can be so supported so long as the antennae can be simultaneously rotated with the auxiliary antenna properly poised and separately stoppable to face a selected direction about the search axis in order to complement main antenna coverage of a selected volumn of space in that direction.

Figure 3:
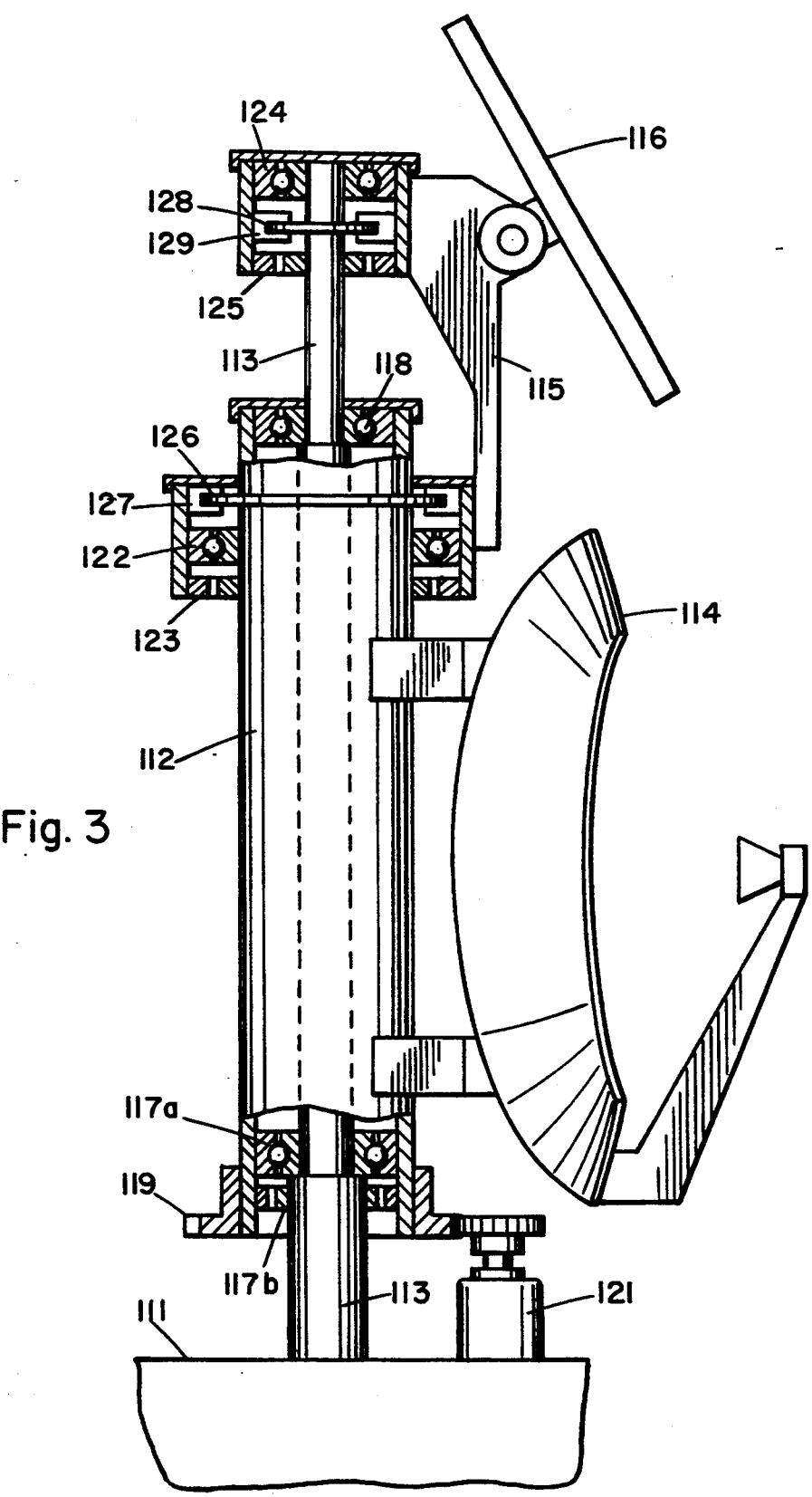
FIG. 3 is a side elevation view of a second embodiment.

A second embodiment of an antenna support constructed in accordance with the invention is illustrated in FIG. 3, wherein components are designated with reference numerals increased by 100 over those designating corresponding components in FIG. 1. The second embodiment employs a hollow structure as rotatable mast 112 supporting main antenna 114, and a shaft extending coaxially through it as fixed mast 113 which is mounted so that it will not rotate. This type of coaxial arrangement is opposite that employed in the embodiment illustrated in FIG. 1. Both arrangements combine coaxial masts with an independently rotatable carriage mounted on them to rotatably support two antennae according to the inventive concepts of the invention with carriage 115 supporting auxiliary antenna 116 in the embodiment of FIG. 3.

In FIG. 3, bearing 122 and slip-ring assembly 123 rotatably mount the carriage 115 on the fixed mast 113, while the bearing 124 and slip-ring assembly 125 rotatably mount the carriage 115 on the rotatable mast 112. As before, these components are chosen to withstand the pressures and forces involved in operating a radar antenna structure.

The embodiment of FIG. 3 includes both a flying clutch mechanism and a stop clutch mechanism each comprising a disc-and-calipers combination connected between the carriage 115 and the rotatable mast 112 and fixed mast 113, respectively. The flying clutch mechanism employs an axially aligned disc 126 rigidly attached to the rotatable mast 112 to rotate therewith, and calipers 127 attached to the carriage 115 to selectively engage the disc 126 and interconnect the carriage 115 and the rotatable mast 112. The stop clutch mechanism comprises a disc 128 and selectively activated calipers 129 connected between the carriage 115 and the fixed mast 113. As in the embodiment of FIG. 1, other clutch-type or brake mechanisms may be employed.

The structural differences between the two embodiments of FIGS. 1 and 3 are reflected in the mounting of the rotatable mast 112. In the alternate embodiment, lower bearing 117a and lower slip-ring 117b are employed between the rotatable mast and the fixed mast, instead of main bearing 17 between the rotatable and the support structure shown in FIG. 1. Lower bearing 117a and lower slip-ring 117b cooperate along with the bearing 118 to rotatably mount mast 112 on support structure 111 by mounting it on the fixed mast which is in turn mounted on the support structure. The lower bearing and lower slip-ring in FIG. 3 permit mast 112 of the alternate embodiment to rotate about the fixed mast and a common search axis with which the masts are in axial alignment when driven by the bull gear 119 and azimuth drive motor 121. The lower bearing and lower slip-ring are chosen using the same design considerations as apply to bearing 17 in FIG. 1.

The second embodiment also differs from the embodiment of FIG. 1 in not including a second carriage or a second auxiliary antenna corresponding to carriage 30 and antenna 31 of FIG. 1. However, it is otherwise similar to the embodiment of FIG. 1 in employing the broader aspects of the invention.

Figure 4:
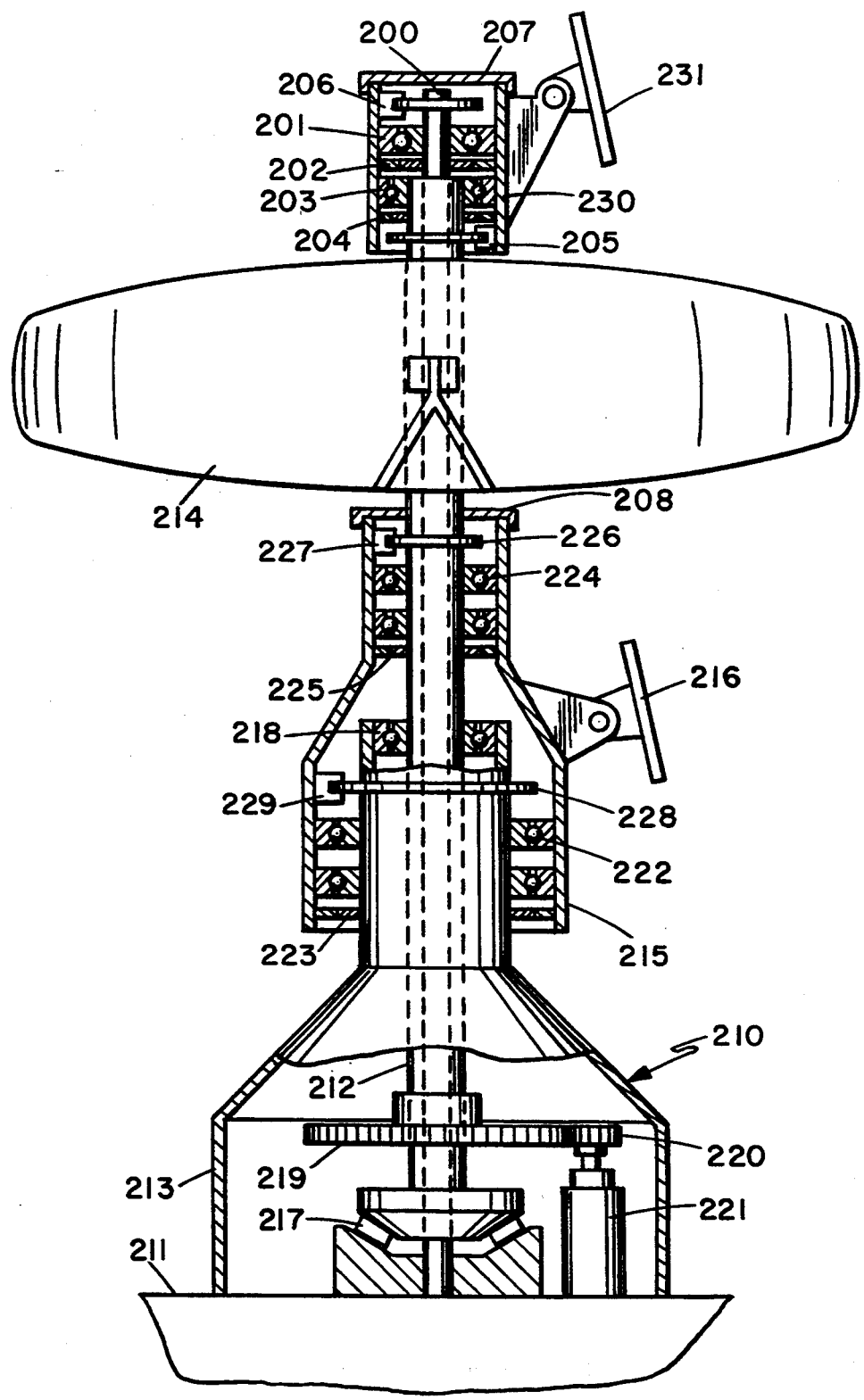
FIG. 4 illustrates a third embodiment that employs three coaxial masts.

The coaxial mast concept employed in the embodiments illustrated in FIGS. 1 and 3 of the invention can be extended to three coaxial masts as illustrated in FIG. 4 wherein components of an antenna structure 210 are designated by reference numerals increased by 200 over those of corresponding components in FIG. 1. Three coaxial masts are combined with two carriages to permit each carriage, and an auxiliary antenna mounted thereon, to be rotated with the main antenna or stopped while the main antenna as well as the other carriage and auxiliary antenna continue to rotate.

In FIG. 4, bearing 222 and slip-ring assembly 223 rotatably mount a carriage 215 supporting auxiliary antenna 216 on the fixed mast 213, with a bearing 224 and slip-ring assembly 225 rotatably mounting the carriage 215 on the rotatable mast 212. As before, these components are chosen to withstand the pressures and forces involved in operating a radar antenna structure.

The embodiment of FIG. 4 incorporates a first flying clutch mechanism and a first stop clutch mechanism each comprising a disc-and-calipers combination connected between the carriage 215 and the rotatable mast 212 and fixed mast 213, respectively. The first flying clutch mechanism employs an axially aligned disc 226 rigidly attached to the rotatable mast 212 to rotate therewith, and calipers 227 attached to the carriage 215 to selectively engage the disc 226 and interconnect the carriage 215 and the rotatable mast 212. The first stop clutch mechanism comprises a disc 228 and selectively activated calipers 229 connected between the carriage 215 and the fixed mast 213. As in the embodiment of FIG. 1, other clutch-type or brake mechanisms may be employed.

A third mast, inner mast 200, is provided that is mounted on the common support structure 211 to extend coaxially through and beyond rotatable mast 212 resting on a main bearing 217. The third mast is mounted so that it will not rotate while gears 219 and 220 are rotated by a motor 221 to rotate the mast 212.

Second carriage 230 is rotatably mounted on both the third mast and the rotatable mast to carry second auxiliary antenna 231. It is rotatably mounted on the third mast by bearing 201 and slip-ring assembly 202, and on the rotatable mast by bearing 203 and slip-ring assembly 204.

The second carriage includes a second flying clutch mechanism 205 for selectively interconnecting the carriage 230 and the rotatable mast 212 so that they will rotate together. The second carriage also includes stop clutch mechanism 206 for selectively interconnecting the carriage 230 and the third mast 200 to cause carriage rotation to stop. These clutch mechanisms are disc-and-calipers combinations similar to the other clutch mechanisms of the illustrated embodiments. They are capable of being selectively-activated by a separate electrical control signal, and of withstanding the weight and torsional forces involved while achieving the dynamic response characteristics desired.

The embodiment of FIG. 4 also illustrates separate cap and seal arrangements, cap 207 and cap 208, in place over each of the carriages to exclude rain, snow, sleet, etc.

The three-mast antenna support of FIG. 4 eliminates the interference between carriages that exists in the two-mast configuration of FIG. 1. Even though one carriage is fully stopped, the other can continue to rotate.

Although a three-mast support is illustrated in FIG. 4 by means of an embodiment having a rotatable middle mast, the middle mast may be fixed instead, with the inner and outer masts being rotatable. Rotational components similar to those described for the illustrated embodiments may be employed to rotate the inner and outer masts and to maintain the middle mast fixed. Much like the embodiment of FIG. 4, two carriages may be employed for rotatably supporting two auxiliary antennae. Unlike the embodiment of FIG. 4, a main antenna would be mounted on one of the two rotatable masts instead of on the middle mast, and a fourth antenna could be mounted on the other of the two rotatable masts. Suitable rotational components for rotating the inner and outer masts at different speeds may be included also to further increase system functionality.

Figure 5:
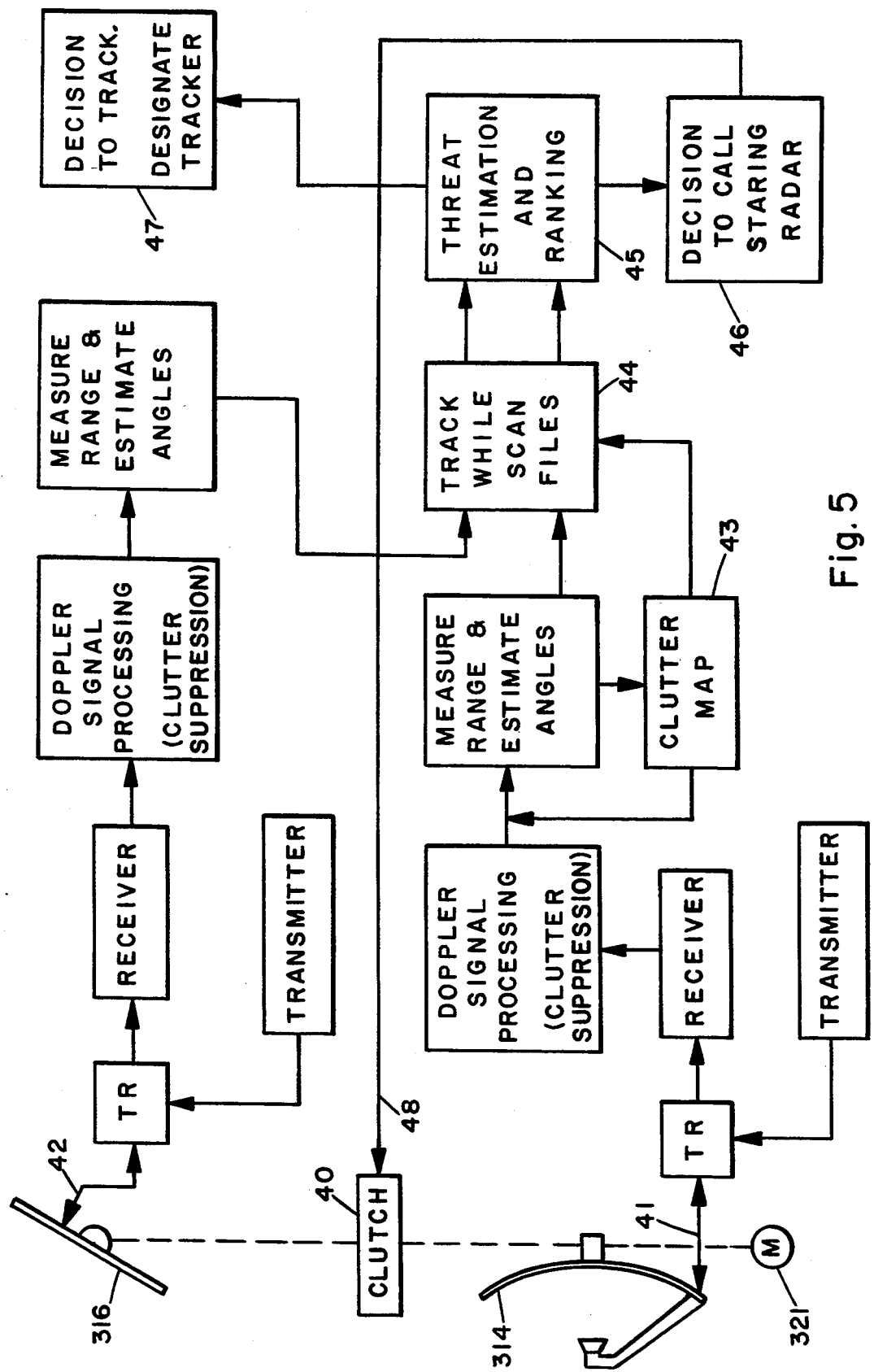
FIG. 5 is a block diagram of an associated control system.

An associated control system for use with an antenna support according to this invention is illustrated in block diagram form in FIG. 5. The block diagram illustrates several interrelated functions that a control system may employ in conjunction with the antenna support to achieve full-function tracking or fire-control. These functions can be implemented using radar control system design principles and data processing techniques that are well-known in the art.

For convenience, the control system of FIG. 5 illustrates main antenna 314, auxiliary antenna 316, and azimuth drive motor 321, using reference numerals increased by 200 over those used for corresponding components in FIG. 3. The illustrated antennae may typically rotate together as main antenna 314 performs a routine hemispherical search until it is desired to stop rotation of auxiliary antenna 316. A flying clutch mechanism and a stop clutch mechanism are collectively represented by block 40, and control system logic and circuitry is provided for generating control signals to be used in selectively-activating the clutch mechanisms to either cause auxiliary antenna 316 to rotate together with main antenna 314, or cause rotation of the auxiliary antenna to stop.

The control system operates in conjunction with two radar channels that each transmit and receive radar signals via a corresponding one of the antennae. A main channel is connected to the main antenna with main transmission line 41, and an auxiliary channel is connected to the auxiliary antenna with auxiliary transmission line 42 (FIG. 5). Each channel has a transmitter and a receiver connected with a TR (transmit-receive) device to the corresponding transmission line as illustrated in FIG. 5.

Pulses to be transmitted originate in one of the transmitters and they are conducted through the corresponding TR device and along the corresponding transmission line to the antenna to which the line is connected. The pulses are radiated from the antenna, and some are reflected from targets to return to the antenna. The target return signals subsequently received by the antenna are conducted back along the transmission line through the TR device and on to the receiver.

The receiver in each channel may comprise amplifiers and frequency-selective RF and IF filters. Signals from the receivers may typically be processed by Doppler signal processing and clutter suppression circuitry, and a clutter map may be included for further clutter suppression as indicated in FIG. 5 by block 43. The target return signals may be further processed to generate a set of positional data for each that is representative of the position of the target, including direction, range, and estimated elevation angle, and the positional data may then be coupled to TWS (track-while-scan) files, all according to usual methods employed in the art.

The TWS files, block 44 in FIG. 5, provide a further filtering process. They track each target return signal, that survives the earlier filtering process, as hemispherical searching continues. Each track is coupled to block 45 where it is evaluated in accordance with preestablished threat criteria, which may be adaptive to prevailing conditions, and given its own threat index. The threat indices are indicators of relative threat importance, and after being ranked in descending order they are submitted to blocks 46 and 47 for examination.

Block 46 examines the threat indices and compares them to a lower threshold of target importance. The lower threshold is one at which it is decided to gather data of finer granularity than available from the main channel by causing the auxiliary antenna to stop and stare at a target of interest. When the lower threshold is detected by block 46, appropriate control signals are generated and communicated over line 48 to the clutch mechanisms represented by block 40 to cause rotation of auxiliary antenna 316 to stop for this purpose.

Block 47 examines the threat indices and compares them to a higher threshold of target importance. The higher threshold is one at which it is decided to employ a separate tracking system, such as a radar or electro-optical tracking system and, perhaps, a weapon as well. When the higher threshold is detected by block 47, appropriate control signals are generated and communicated to whatever separate tracking system and/or weapon may be chosen to react.

Block 46 also contains a higher threshold which may be programmed to call the separate tracking system directly as well as auxiliary antenna 316. This may occur, for example, when a very threatening target is unexpectedly unmasked near a defended area.

When the threat subsides so that the threat indices fall below the lower threshold, block 46 causes appropriate control signals to be communicated to block 40 to cause the antennae to rotate together again.

There may be two classes of lower threshold that are examined by block 46, the higher being for calling the auxiliary antenna to acquire and track a threatening target, and the lower being for calling the auxiliary antenna to face the direction of a jammer or other source of interference in order to augment radar coverage of the main antenna in that direction. In case several jammers are affecting the coverage, block 46 may be programmed to cause the auxiliary antenna to timeshare its attention between them.

The degree by which the auxiliary antenna will lag behind the main antenna to be properly poised for target acquisition may be derived and provided for in the control system also, with an appropriate control being generated for communication to block 40.

The separate transmitting, receiving and signal-processing system of the auxiliary channel may feature greater resolution capability for targets and jammers than the main channel, with the RF frequency employed being higher. This permits the TWS files to refine the accuracy and resolution of the track data accordingly. The threat estimation and ranking are also revised in accordance with the data from the auxiliary channel with improved target unmasking ability that is highly immune to interference. Also, accurate positional data is available for use by a separate tracking and/or weapon called into use by block 47, and the separate system is saved from executing its time-consuming search pattern in order to acquire the target.

When the illustrated control circuit is used with an antenna support having two carriages and associated auxiliary antennae, such as the embodiments of FIGS. 1 and 4, block 46 may also include provisions for choosing between two auxiliary antennae, and shuffling tasks between them in the manner most advantageous. Also, a third radar channel may be employed in conjunction with the second auxiliary antenna, and the control system expanded accordingly.

The foregoing is a complete description of three embodiments of an antenna support and an associated control system constructed in accordance with the invention. While the invention has been illustrated and described by means of specific embodiments, it is to be understood that numerous changes and modifications may be made without departing from the spirit and scope of the invention as defined in the appended claims.

What is claimed is:

1. A radar system, which comprises:
   a main antenna which is a broad-beam antenna, including means for rotatably supporting the main antenna for allowing repetitive rotation about a search axis to permit use in searching for radar targets about the search axis;
   an auxiliary antenna which is a narrow-beam antenna, including means for rotatably supporting the auxiliary antenna for rotation about the search axis for use in complementing main antenna search coverage about the search axis;
   synchronization means for simultaneously rotating the antennae in response to at least a first control signal with the auxiliary antenna poised in position relative to the main antenna for being stopped to face a selected direction just searched by the main antenna;
   stopping means for selectively causing rotation of the auxiliary antenna to stop in response to at least a second control signal with the auxiliary antenna facing the selected direction as rotation of the main antenna continues;
   main channel means for transmitting and receiving radar signals via the main antenna;
   auxiliary channel means for transmitting and receiving radar signals via the auxiliary antenna; and
   processing means for generating at least a first and a second control signals, coupled to said synchronization and said stopping means respectively, in response to the presence of predetermined types of radar signals received by the main and auxiliary channel means, said first control signal indicative of conditions where simultaneous antennae rotation is desired, and said second control signal being indicative of predetermined conditions where stopping rotation of the auxiliary antenna is desired.

2. The radar system recited in claim 1 wherein the control system includes:
   means for processing a target return signal received from a target to generate a set of positional data representative of the target; and
   means for evaluating the set of positional data to rank the threat of the target and assign a corresponding threat index.

3. The radar system recited in claim 2 which includes means for evaluating the set of positional data according to pre-established threat criteria that are adaptive to prevailing conditions.

4. The radar system recited in claim 2 which includes means for comparing a plurality of threat indices for a corresponding plurality of targets in order to select one of the targets for coverage by the auxiliary antenna.

5. The radar system recited in claim 4 which includes means for selecting one of the targets for tracking by a separate tracking system.

6. The radar system recited in claim 1 wherein the control system includes means for generating a control signal for use in selectively causing the auxiliary antenna to stop facing a selected direction about the search axis to augment radar coverage of the main antenna in the selected direction.

7. The radar system recited in claim 1 wherein the control system includes means for controlling the position of the auxiliary antenna relative to the main antenna so that the auxiliary antenna can be most quickly stopped in position to face a direction just searched by the main antenna.

8. The radar system recited in claim 1 wherein the auxiliary antenna has a radiation pattern that is narrow in both elevation and azimuth.

9. The radar system recited in claim 1 wherein the auxiliary antenna is a height-finding antenna.

10. The radar system recited in claim 1 which includes a coaxially-masted antenna support, the coaxially-masted antenna support comprising:
    a pair of coaxial masts mounted on a common support structure, a first one of the masts being rotatably mounted to support the main antenna, and a second one of the masts being fixed;
    a carriage rotatably mounted on both coaxial masts to support the auxiliary antenna; and
    means for selectively interconnecting the carriage and the rotatable mast to cause the carriage and the rotatable mast to rotate together and means for selectively interconnecting the carriage and the fixed mast to cause carriage rotation to stop.

11. The radar system recited in claim 10 which includes a selectively-activated clutch mechanism connected between the carriage and the rotatable mast.

12. The radar system recited in claim 10 which includes a selectively-activated clutch mechanism connected between the carriage and the fixed mast.

13. The radar system recited in claim 10 wherein each of the interconnecting means includes a magnetic particle clutch.

14. The radar system recited in claim 10 wherein the rotatable mast extends through the fixed mast.

15. The radar system recited in claim 10 wherein the fixed mast extends through the rotatable mast.

16. The radar system recited in claim 10 which includes a second carriage rotatably mounted on the masts to support another antenna.

17. The radar system recited in claim 1 which includes an antenna support suitable for rotatably supporting three radar antennae, the antenna support comprising:
three coaxial masts mounted on a common support structure, an outer mast of the three being fixed to not rotate, a middle mast of the three being rotatably mounted to extend from the support structure through and beyond the outer mast to rotatably support the main antenna, and an inner mast of the three being fixed to not rotate and to extend from the support structure through and beyond the middle mast;
a first carriage rotatably mounted on the outer and middle masts to support the auxiliary antenna, including means for selectively interconnecting the first carriage and the middle mast to cause the first carriage and the middle mast to rotate together and for selectively interconnecting the first carriage and the outer mast to cause rotation of the first carriage to stop; and
a second carriage rotatably mounted on the middle and inner masts to support a third antenna, including means for selectively interconnecting the second carriage and the middle mast to cause the second carriage and the middle mast to rotate together and for selectively interconnecting the second carriage and the inner mast to cause rotation of the second carriage to stop.

18. The radar system recited in claim 17 wherein each of the interconnecting means includes a magnetic particle clutch.

19. An antenna support for rotatably supporting two antennae, which comprises:
a pair of coaxial masts mounted on a common support structure, a first one of the masts being rotatably mounted to support a first one of the antennae, and a second one of the masts being fixed;
a carriage rotatably mounted on both coaxial masts to support the a second one of the antennae; and
means for selectively interconnecting the carriage and the rotatable mast to cause the carriage and the rotatable mast to rotate together, and for selectively interconnecting the carriage and the fixed mast to cause carriage rotation to stop.

20. The antenna support recited in claim 19 wherein each of the interconnecting means includes a selectively-activated clutch mechanism.

21. The antenna support recited in claim 19 wherein each of the interconnecting means includes a selectively-activated magnetic particle clutch.

22. The antenna support recited in claim 19 wherein the rotatable mast extends through the fixed mast.

23. The antenna support recited in claim 19 wherein the fixed mast extends through the rotatable mast.

24. The antenna support recited in claim 19 which includes a second carriage rotatably mounted on the masts to support another antenna.

25. The antenna support recited in claim 19 which includes control means for use in selectively causing the carriage to lag behind the first one of the antennae in accordance with the time required to stop carriage rotation.

26. An antenna support suitable for rotatably supporting three radar search antennae, which comprises:
three coaxial masts mounted on a common support structure, an outer mast of the three being fixed to not rotate, a middle mast of the three being rotatably mounted to extend from the support structure through and beyond the outer mast to rotatably support a first one of the antennae, and an inner mast of the three being fixed to not rotate and to extend from the support structure through and beyond the middle mast;
a first carriage rotatably mounted on the outer and middle masts to support a second one of the antennae, including means for selectively interconnecting the first carriage and the middle mast to cause the first carriage and the middle mast to rotate together and for selectively interconnecting the first carriage and the outer mast to cause rotation of the first carriage to stop; and
a second carriage rotatably mounted on the middle and inner masts to support a third one of the antennae, including means for selectively interconnecting the second carriage and the middle mast to cause the second carriage and the middle mast to rotate together and for selectively interconnecting the first carriage and the inner mast to cause rotation of the second carriage to stop.

27. The antenna support recited in claim 26, wherein each of the interconnecting means includes a clutch mechanism.

28. The antenna support recited in claim 27, wherein each clutch mechanism can be electrically activated.

29. The radar system recited in claim 28 wherein each clutch mechanism includes a magnetic particle clutch.

30. A coaxially-masted antenna support, which comprises:
three coaxial masts mounted on a common support structure, an outer mast of the three being rotatably mounted, a middle mast of the three being fixed to not rotate and to extend from the support structure through and beyond the outer mast, and an inner mast of the three being rotatably mounted to extend from the support structure through and beyond the middle mast;
a first carriage rotatably mounted on the outer and middle masts to support an antenna, including means for selectively interconnecting the first carriage and the outer mast to cause the first carriage and the outer mast to rotate together and for selectively interconnecting the first carriage and the middle mast to cause rotation of the first carriage to stop; and
a second carriage rotatably mounted on the middle and inner masts to support another antenna, including means for selectively interconnecting the second carriage and the inner mast to cause the second carriage and the inner mast to rotate together and for selectively interconnecting the second carriage and the middle mast to cause rotation of the second carriage to stop.

* * * * *